United States Patent
Vegesna

(10) Patent No.: US 7,393,456 B1
(45) Date of Patent: Jul. 1, 2008

(54) SYSTEM AND METHOD FOR CONCENTRATING AND REMOVING SLUDGE AT THE BOTTOM OF A WASTE WATER HOLDING TANK

(76) Inventor: Subba R. Vegesna, 11 Dogwood Ct., Morrisville, PA (US) 19067

( * ) Notice: Subject to any disclaimer, the term of this patent is extended or adjusted under 35 U.S.C. 154(b) by 0 days.

(21) Appl. No.: 11/374,887

(22) Filed: Mar. 15, 2006

(51) Int. Cl.
*B01D 21/24* (2006.01)

(52) U.S. Cl. .................. 210/803; 210/524; 210/527; 210/535

(58) Field of Classification Search .............. 210/800, 210/803, 523, 524, 526, 527, 533, 534, 535, 210/536; 417/545
See application file for complete search history.

(56) References Cited

U.S. PATENT DOCUMENTS

| | | | | |
|---|---|---|---|---|
| 28,405 | A * | 5/1860 | Race | 417/545 |
| 1,777,052 | A * | 9/1930 | Shepherd | 417/545 |
| 1,879,135 | A * | 9/1932 | Downes et al. | 210/527 |
| 3,285,415 | A * | 11/1966 | Walker | 210/526 |
| 3,677,407 | A * | 7/1972 | McIlvaine | 210/803 |
| 3,857,788 | A | 12/1974 | Smith | 210/520 |
| 4,160,732 | A | 7/1979 | Maffet | 210/75 |
| 4,260,488 | A * | 4/1981 | Condolios | 210/533 |
| 4,871,449 | A * | 10/1989 | Lott | 210/524 |
| 4,971,693 | A * | 11/1990 | Akesaka | 210/524 |
| 5,676,827 | A * | 10/1997 | Bruke | 210/524 |
| 6,568,541 | B2 * | 5/2003 | Koreis et al. | 210/534 |
| 6,607,666 | B2 * | 8/2003 | Rajewski | 210/536 |

* cited by examiner

*Primary Examiner*—Christopher Upton
(74) *Attorney, Agent, or Firm*—LaMorte & Associates

(57) ABSTRACT

A new settlement tank and its associated method of operation. The settlement tank has side surfaces and a bottom surface that define a tank of a predetermined volume. A trough is disposed in the bottom surface of the tank. At least one outlet port communicates with the trough. A press assembly is provided that includes a press head and an actuator for selectively advancing the press head into the trough. In operation, the settlement tank is filled with material that includes liquids and solids. The heavy solids are permitted to settle at the bottom of the tank. The solids are then collected in the trough. Once solids are in the trough, the press assembly is used to compact and concentrate the solids within the trough. Once concentrated, the outlet port is opened and the contents of the trough are flushed out of the settlement tank.

7 Claims, 2 Drawing Sheets

SYSTEM AND METHOD FOR CONCENTRATING AND REMOVING SLUDGE AT THE BOTTOM OF A WASTE WATER HOLDING TANK

BACKGROUND OF THE INVENTION

1. Field of the Invention

In general, the present invention relates to waste water treatment facilities where solids are separated out of waste water. More particularly, the present invention relates to storage tank configurations and processes used within storage tanks to separate solids from waste water.

2. Prior Art Description

In most modern industrialized countries, waste water is collected and treated prior to being released back into the environment. Waste water is the general name given to the water that flows down drains and into the local sewer system. Waste water also comes from many factories that generate waste water as part of an industrial manufacturing process. Waste water in the local sewer system is typically treated by the local municipality. Waste water generated by factories is often treated on-site by a private water treatment plant.

Waste water contains many contaminants. As such, the waste water must be treated before it is returned to the environment. Typically, the first step used to treat waste water is to separate solid materials out of the waste water. Waste water contains many solids. Runoff from street sewer grates contain leaves, sticks, garbage and a variety of other debris. Waste water from buildings contains fecal matter and paper.

In the prior art, sewers guide waste water to a municipal waste water treatment facility. In this facility, the waste water is first sent into settlement tanks. In a settlement tank, waste water is allowed to come to rest. Any solid matter that is heavier than water will collect at the bottom of the settlement tank. Any solid matter that is lighter than water will float to the top of the settlement tank. The solids floating at the top of the settlement tank are skimmed away. The solids at the bottom of the tank are much harder to separate and collect from the liquid stream.

Solids are typically not drawn up through the water. To do so would mix the solids back into the remaining waste water. Rather, solids at the bottom of a settlement tack are usually pushed to one point in the tank by a slow moving conveyor. An outlet port is present at the bottom of the tank. Once enough solids have been collected, the outlet port is opened. Once opened, the pressure head of the waste water pushes the collected solids out of the outlet port. The discharged solids and waste water are collected in another tank. The discharged waste water has a concentration of solids of approximately 1%-2%, which is still at least 98% water.

Prior art system that use conveyors in settlement tanks to move solids near a backwash port are exemplified by U.S. Pat. No. 3,857,788 to Smith, entitled Sediment Apparatus With Plural Sludge Discharge Feature.

Once the sludge heavy backwash water is removed from the settlement tank, the sludge heavy backwash water is sent to a dewatering facility. The dewatering facility removes water from the solid waste until the remaining solids reach the consistency of sludge, which is typically between 15% and 30% solids. The sludge can then be incinerated, buried or land applied to increase the fertility of soil.

Facilities that dewater sludge-heavy waste water are exemplified by U.S. Pat. No. 4,160,732 to Maffet, entitled Mechanical Dewatering Process.

One of the main problems with the prior art treatment of sludge-heavy water is that dewatering facilities require a great deal of energy to run. Energy is expensive and is becoming more expensive year after year. Furthermore, dewatering facilities also consume large areas of space in a waste water facility.

A need therefore exists for a new system and method that increases the efficiency at which sludge is separated from water in the original settlement tank. By creating sludge-heavy backwash that has a higher concentration of solids, less dewatering is required. Less dewatering results in less use of energy, less processing spacing, and greater cost savings. This need is met by the present invention as described and claimed below.

SUMMARY OF THE INVENTION

The present invention is a settlement tank and its associated method of operation. The settlement tank has side surfaces and a bottom surface that define a tank of a predetermined volume. A trough is disposed in the bottom surface of the tank. At least one outlet port communicates with the trough.

A press assembly is provided that includes a press head and an actuator for selectively advancing the press head into the trough.

In operation, the settlement tank is filled with material that includes liquids and solids. The heavy solids are permitted to settle at the bottom of the tank. The solids are then collected in the trough. Once solids are in the trough, the press assembly is used to compact and concentrate the solids within the trough. Once concentrated, the outlet port is opened and the contents of the trough are flushed out of the settlement tank.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention can be applied to many different designs of settlement tanks, such as potable water treatment settlement tanks and commercial food processing settlement tanks, the present invention is particularly well suited for waste water treatment facilities. Accordingly, the present invention system and method will be described for use in separating solids from waste water in order to set forth the best mode contemplated for the invention. The choice of the exemplary embodiment, however, should not be considered a limitation on the invention in its application to other industries.

Figure 1:
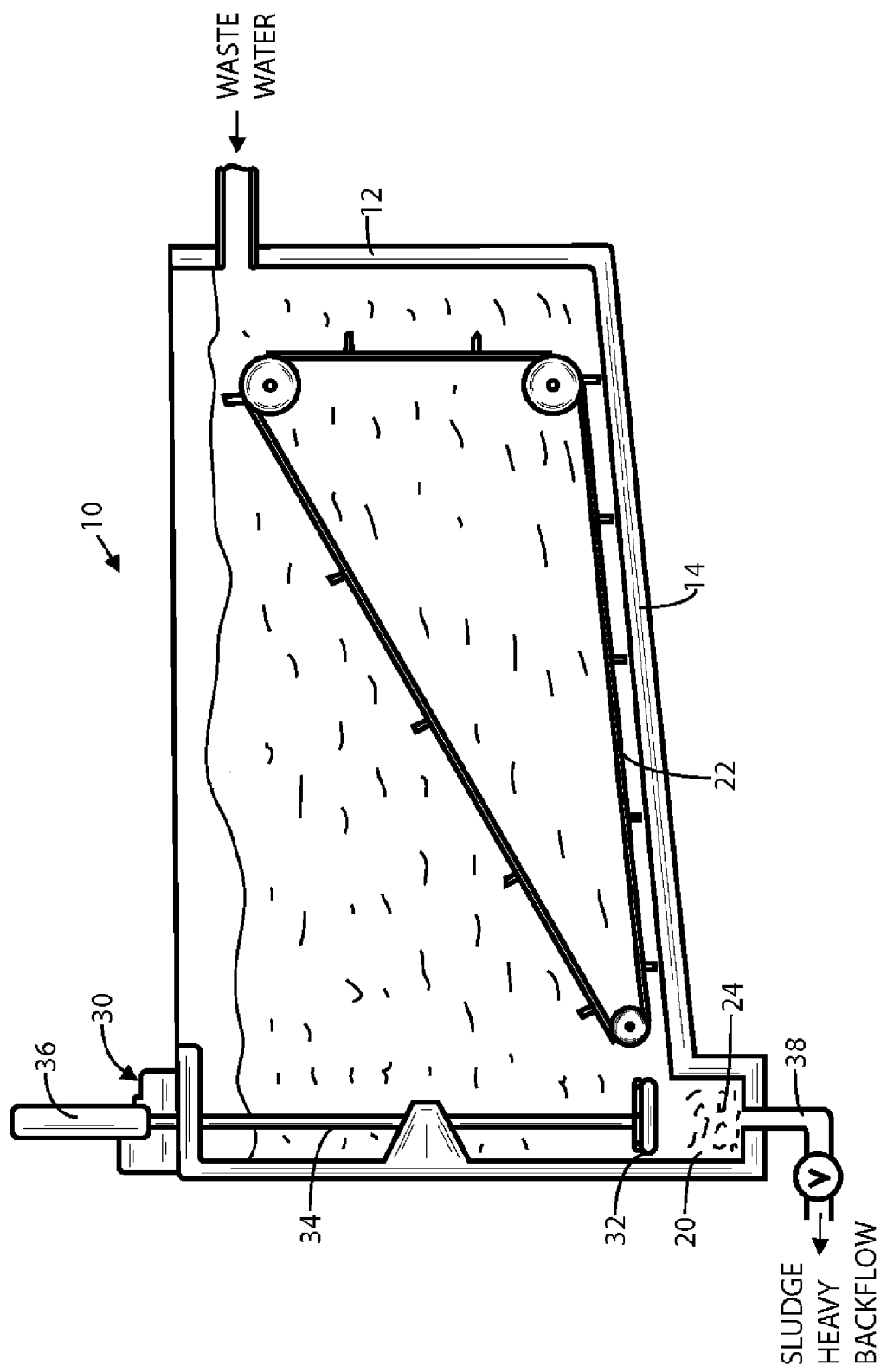
FIG. 1 is a cross-sectional view of an exemplary embodiment of a the present invention settlement tank.

Referring to FIG. 1, there is shown an exemplary embodiment of a waste water settlement tank 10. The settlement tank 10 is defined by side walls 12 and a bottom 14. The peripheral shape and capacity of the settlement tank 10 is a matter of design choice and relies upon the needs of the waste water facility.

A trough 20 is formed in the bottom 14 of the settlement tank 10. The trough 20 extends along the bottom of one side of the settlement tank 10. The trough 20 has a width and a depth, which may be in the order of two feet to five feet, depending upon the size of the settlement tank 10.

The trough 20 is the lowest point in the settlement tank 10. The remaining bottom 14 of the settlement tank 10 may slope toward the trough 20. Alternatively, a paddle conveyor 22 can be employed to direct settled solids 24 into the trough 20. Regardless of the design used, all solids that sink to the bottom of the settlement tank are directed toward the trough 20. It will therefore be understood that the trough 20m will be the first portion of the settlement tank 10 that will fill with solids 24.

A press assembly 30 is constructed into the settlement tank 10 above the trough 20. The press assembly 30 includes a press head 32 that is coupled to guide rods 34. The guide rods 34 extend vertically out of the settlement tank 10. The guide rods 34 engage an actuator 36 that selectively raises and lowers the guide rods 34. The actuator 36 can be electric, hydraulic, pneumatic or manually powered. The actuator 36 raises and lowers the guide rods 34 and the press head 32 by a distance that is longer than the height of the trough 20 is high. Consequently, the press head 32 can be advanced to a first position at the bottom of the trough 20. Conversely, the press head 32 can be raised to a second position that is completely out of the trough 20, so as not to obstruct any solids 24 that may be traveling toward the trough 20.

At least one outlet port 38 communicates with the bottom of the trough 20. It will be understood that when an outlet port 38 is open, the water pressure from the contents of the settlement tank 10 will cause the contents of the trough 20 to flow out of the settlement tank 10 through that outlet port 38.

Using nothing but gravity to concentrate solids in the trough 20, the contents of the trough 20 will typically be only 1%-2% solids. The rest of the volume remains primarily water. The press assembly 30 is used to increase the concentration of solids. Periodically, the press assembly 30 is used to advance the press head 32 against the contents of the trough 20. The press head 32 is highly permeable to water, yet not so permeable to solids 24, as will later be explained. Accordingly, when the press head 32 is advanced, it compacts the solids 24 in the trough 20. Through repeated compaction cycles, the concentration of solids present in the trough 20 can be increased from 1%-2% to between 4% and 10%. The lower range can be achieved after a single compression cycle. At such concentrations, the solids 24 in the trough 20 still flow freely with the water. Consequently, when the outlet port 38 is opened, the solids 24 will run out of the trough 20 and into the outlet port 38. However, the sludge heavy backflow will have a much higher concentration of solids 24 and will therefore require less dewatering.

Figure 2:
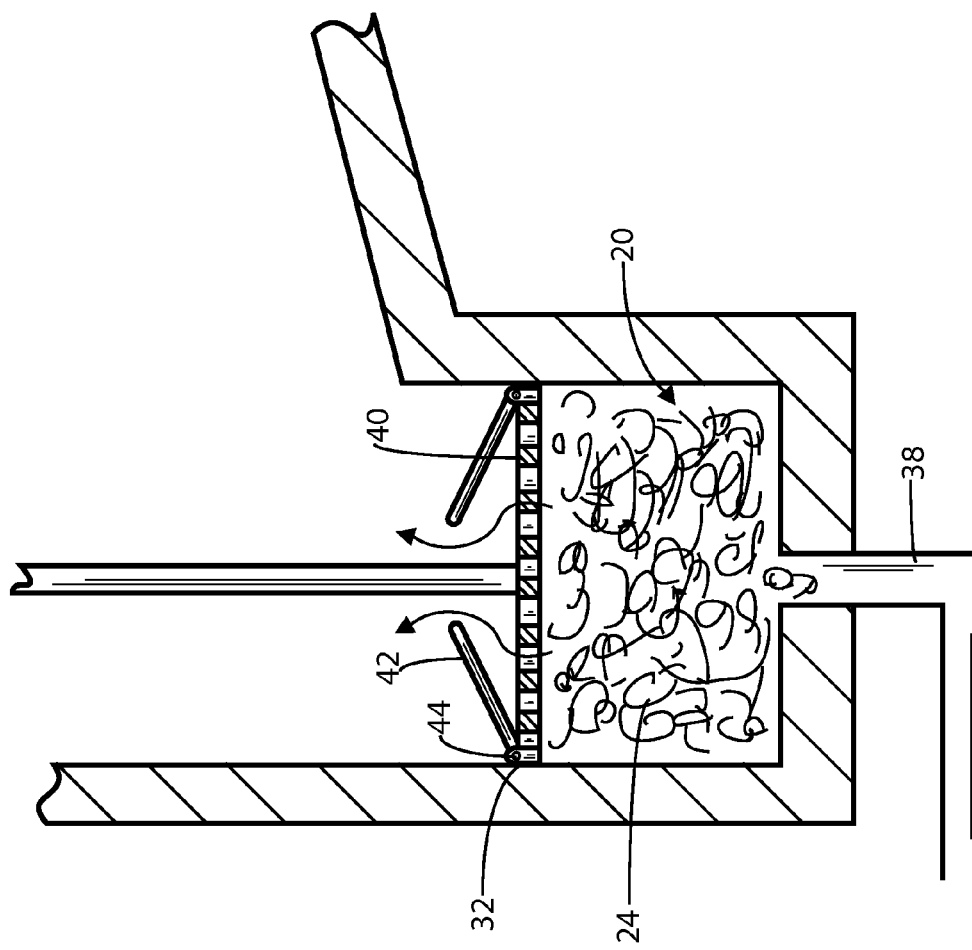
FIG. 2 is an enlarged view of the press head and trough features of the embodiment of FIG. 1.

Referring to FIG. 2, it can be seen that the press head 32 is comprised of a perforated plate 40. The perforated plate 40 enables water to flow freely through the press head 32, while still providing a significant obstruction to solids 24. To further inhibit the flow of solids 24, flaps 42 are present on top of the perforated plate 40. The flaps 42 are attached to the perforated plate 40 at hinges 44. Accordingly, the flaps 42 are free to rotate about the hinges 44 between a closed position and an open position. In the closed position, the flaps 42 lay flat against the top of the perforated plate 40. In the open position, the flaps 42 rotate away from the perforated plate 40.

In operation, the press head 32 is raised well above the trough 20 so that solids 24 can fall into the trough 20 uninhibited. Periodically, the press head 32 is lowered into the trough 20. As the press head 32 is lowered, the perforated plate 40 contacts the solids 24 that lay in the trough 20. The solids 24 become compressed under the press head 32. Water in the trough 20 passes through the perforated plate 40 and causes the flaps 42 to open. The water in the trough 20 is therefore permitted to escape as the solids 24 are compacted.

It will be understood that the flap 42 are being used as a check valve that prevents backward flow. The flaps 42 are therefore intended to be exemplary of many different configurations and assemblies that would act as a check valve in the described application.

To empty the trough 20, the press head 32 is again advanced against the solids 24 in the trough 20. The outlet port 38 is then opened. Once the outlet port 38 is opened, the press head 32 is continuously advanced. The water pressure from the water above the press head 32, keeps the flaps 42 in their closed position. This prevents water from rushing through the press head 32 and into the trough 20. However, the press head 32 does not make a watertight seal. Accordingly water is still able to flow around the press head 32. The combined water pressure and advancing press head 32 force the contents of the trough 20 to flow out through the outlet port 38.

The contents of the trough 20 that pass through the outlet port 38 are free flowing, yet have a relatively high concentration of solids 24. It will therefore take significantly less time and energy to dewater this material. This translates to lower capital and material costs.

It will be understood that the embodiment of the present invention that is described and illustrated is merely exemplary and that a person skilled in the art can make many variations to the exemplary embodiment using functionally equivalent components. For example, in the shown embodiment, the contents of the trough are compressed from above. It will be understood that using different configurations, the contents of the trough can be compacted from the side.

It will also be understood that automated controls can be adapted to the overall system of the present invention. The press assembly can be electronically activated and deactivated using timers and pressure sensors that detect pressure in the trough. Using such automated controls, the press assembly can be regulated so that it does not under-compress or over-compress the solids within the trough.

All such variations, modifications and alternate embodiments are intended to be included within the scope of the present invention as set forth by the claims.

What is claimed is:

1. In a settlement tank that receives liquids and solids, a method of concentrating and removing at least some of said solids from the settlement tank, said method comprising the steps of:

providing a collection trough within said settlement tank, wherein said collection trough has at least one outlet port leading thereto;

providing a press head that includes a perforated plate and flaps that enable water to pass through said perforated plate in only one direction;

providing at least one actuator that moves said press head vertically between a first position located inside said collection trough and a second position located above said collection trough;

holding said press head in said second position above said collection trough, therein enabling solids in said settlement tank to collect in said collection trough;

utilizing said actuator to move said press head to said first position within said trough, wherein some water contained within said collection trough passes through said press head and said press head concentrates solids within said collection trough; and selectively opening said at least one outlet port to enable contents from said collection trough to flow out of said settlement tank.

2. The method according to claim 1, further including the step of directing solids that settle in said settlement tank into said collection trough.

3. The method according to claim 2, wherein said step of directing solids includes providing a conveyor within said settlement tank that directs solids into said collection trough.

4. The method according to claim 2, wherein said step of directing solids includes positioning said collection trough in said settlement tank so that gravity biases solids towards said collection trough.

5. The method according to claim 1, further including the step of advancing said press head into said collection trough as said at least one outlet port is opened, wherein said press head helps to displace solids out of said collection trough through said at least one outlet port.

6. A settlement tank assembly for waste water, comprising:
   side surfaces and a bottom surface that define a tank of a predetermined volume;
   a trough disposed in said bottom surface of said tank;
   at least one outlet port that communicates with said trough;
   a press head sized to pass into said trough, said press head containing a perforated plate and flaps that enable water to flow through said perforated plate in only one direction; and
   an actuator for selectively moving said press head vertically between a first position located inside said trough and a second position located above said trough.

7. The assembly according to claim 6, further including a mechanical conveyer for transporting settled solids from said bottom surface of said tank into said trough.

* * * * *